(12) United States Patent
Henson et al.

(10) Patent No.: US 10,981,296 B2
(45) Date of Patent: Apr. 20, 2021

(54) SYSTEM AND METHOD FOR PREHEATING A THERMOPLASTIC CHARGE

(71) Applicant: The Boeing Company, Chicago, IL (US)

(72) Inventors: Landon K. Henson, Snoqualmie, WA (US); John Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 16/419,320

(22) Filed: May 22, 2019

(65) Prior Publication Data

US 2020/0368939 A1 Nov. 26, 2020

(51) Int. Cl.
*B29B 13/02* (2006.01)
*H05B 6/10* (2006.01)
*H05B 6/06* (2006.01)

(52) U.S. Cl.
CPC .............. *B29B 13/02* (2013.01); *H05B 6/06* (2013.01); *H05B 6/107* (2013.01); *H05B 6/108* (2013.01)

(58) Field of Classification Search
CPC ......... B29B 13/02; B29B 13/021; H05B 6/06; H05B 6/105; H05B 6/108; H05B 6/365; B29C 43/00; B29C 41/00; B29C 35/02; B29C 31/04; B29C 31/041; B29L 2031/3076; B29K 2105/251
USPC ............................................. 454/11; 264/322
See application file for complete search history.

(56) References Cited

U.S. PATENT DOCUMENTS

| | | | | |
|---|---|---|---|---|
| 3,347,961 A | * | 10/1967 | Russell | C08J 9/228 264/53 |
| 3,359,353 A | * | 12/1967 | Oddi | B29C 44/10 264/53 |
| 3,709,651 A | * | 1/1973 | Rivat-Lahousse | B29C 44/206 425/4 R |
| 4,293,755 A | * | 10/1981 | Hill | H05B 6/108 118/50.1 |
| 5,286,321 A | * | 2/1994 | Fuss | B29B 17/0026 156/497 |
| 5,565,164 A | * | 10/1996 | Goehner | B29B 13/022 264/15 |
| 5,650,220 A | * | 7/1997 | Greenwood | B29C 70/504 428/300.7 |
| 5,728,309 A | * | 3/1998 | Matsen | B22F 3/105 219/633 |
| 9,623,612 B2 | | 4/2017 | Bartel et al. | |

(Continued)

*Primary Examiner* — Kenneth J Hansen
*Assistant Examiner* — Omar Elraey
(74) *Attorney, Agent, or Firm* — Walters & Wasylyna LLC

(57) ABSTRACT

A system and method for preheating a thermoplastic charge are disclosed. A gas moving unit establishes a flow of a gas through a conduit. A heating assembly is positioned between an inlet and an outlet of the conduit. A holding vessel is in fluid communication with the conduit and houses a thermoplastic particulate material. The thermoplastic particulate material includes a thermoplastic matrix material. The thermoplastic particulate material is introduced to the flow of the gas to yield a gas-particulate mixture. At least one of the gas and the gas-particulate mixture, moving through the conduit, is heated using the heating assembly to yield a heated gas-particulate mixture. The heated gas-particulate mixture is deposited into a mold from the outlet of the conduit.

20 Claims, 7 Drawing Sheets

(56) References Cited

U.S. PATENT DOCUMENTS

| | | | | |
|---|---|---|---|---|
| 2003/0175196 A1* | 9/2003 | Blackwell | ............... | H05B 6/108 423/376 |
| 2006/0237451 A1* | 10/2006 | Sameuls | ............... | A47J 36/027 219/730 |
| 2010/0065552 A1* | 3/2010 | Matsen | ................ | B29C 33/06 219/671 |
| 2013/0134154 A1* | 5/2013 | Matsen | ................ | H05B 6/105 219/634 |
| 2016/0037586 A1* | 2/2016 | Armstrong | ............. | H05B 6/108 219/630 |
| 2017/0014763 A1* | 1/2017 | Crawford | ............... | H05B 6/108 |
| 2017/0113421 A1* | 4/2017 | Tsotsis | ................ | B29C 33/06 |
| 2017/0183465 A1* | 6/2017 | Kawabe | ................ | C08J 5/042 |
| 2018/0162107 A1* | 6/2018 | Xu | ....................... | B32B 27/283 |
| 2019/0335548 A1* | 10/2019 | Li | .................... | H01L 21/68785 |
| 2019/0338688 A1* | 11/2019 | Crawford | ............... | H05B 6/108 |
| 2020/0275705 A1* | 9/2020 | Rogan | .................... | A24F 40/20 |

* cited by examiner

SYSTEM AND METHOD FOR PREHEATING A THERMOPLASTIC CHARGE

FIELD

This application relates to manufacturing of composite materials and, more particularly, to preheating a thermoplastic charge for compression molding.

BACKGROUND

Composite materials have a variety of applications because of their high strength and light weight and, thus, are commonly used in the aerospace, automotive, and other industries. Compression molding of thermoplastic composite materials is one technique for manufacturing composite parts. However, the rate at which composite parts can be produced is limited by the long thermal cycle time needed to heat the compression mold and the thermoplastic composite material to a molding temperature. Accordingly, those skilled in the art continue with research and development efforts in the field of compression molding thermoplastic composite materials and, as such, systems and methods intended to address the above-identified concerns would find utility.

SUMMARY

The following is a non-exhaustive list of examples, which may or may not be claimed, of the subject matter according to the present disclosure.

In an example, a disclosed system for preheating a thermoplastic charge includes a conduit having an inlet and an outlet and a gas moving unit configured to move a gas through the conduit from the inlet to the outlet. The system also includes a heating assembly positioned between the inlet and the outlet to heat the gas moving through the conduit. The system further includes a holding vessel in fluid communication with the conduit. The holding vessel houses a thermoplastic particulate material. The thermoplastic particulate material includes a thermoplastic matrix material. A gas-particulate mixture moves through the conduit to the outlet of the conduit.

In an example, a disclosed method for preheating a thermoplastic charge includes steps of: (1) establishing a flow of a gas through a conduit; (2) introducing a thermoplastic particulate material to the flow of the gas to yield a gas-particulate mixture; (3) heating at least one of the gas and the gas-particulate mixture using a heating assembly to yield a heated gas-particulate mixture; and (4) depositing the heated gas-particulate mixture into a mold.

In another example, the disclosed method for preheating a thermoplastic charge includes steps of: (1) inducing a magnetic field using an induction coil surrounding a conduit; (2) heating a susceptor, positioned in the magnetic field between the induction coil and at least one of a gas and a gas-particulate mixture moving through the conduit, to a Curie temperature of the susceptor, the Curie temperature of the susceptor being less than a melting temperature of a thermoplastic matrix material of the thermoplastic particulate material; and (3) heating at least one of the gas and the gas-particulate mixture by one of: contacting at least one of the gas and the gas-particulate mixture with the susceptor; or moving at least one of the gas and the gas-particulate mixture through at least one flow channel formed by the susceptor.

Other examples of the disclosed system and method will become apparent from the following detailed description, the accompanying drawings and the appended claims.

DETAILED DESCRIPTION

Figure 1:
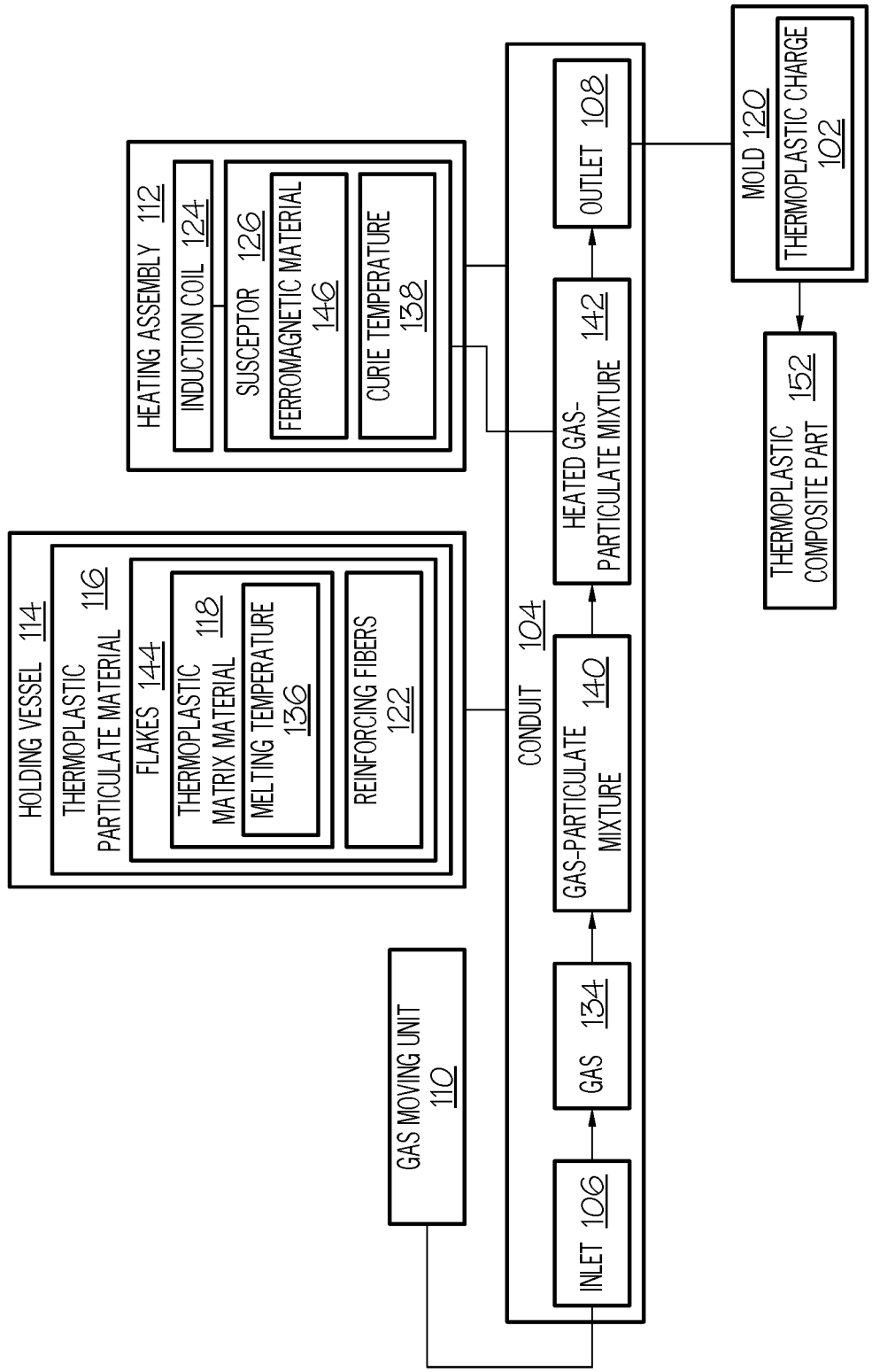
FIG. 1 is a schematic block diagram of an example of the disclosed system for preheating a thermoplastic charge.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring to FIGS. 1-8, by way of examples, the present disclosure describes systems and methods for preheating a thermoplastic charge. Generally, the disclosed systems and methods provide for pre-heating and transporting of a thermoplastic particulate material to a molding tool for a compression molding operation. Heating the thermoplastic particulate material before it enters the molding tool beneficially improves thermal cycle times needed to complete the compression molding operation.

Figure 2:
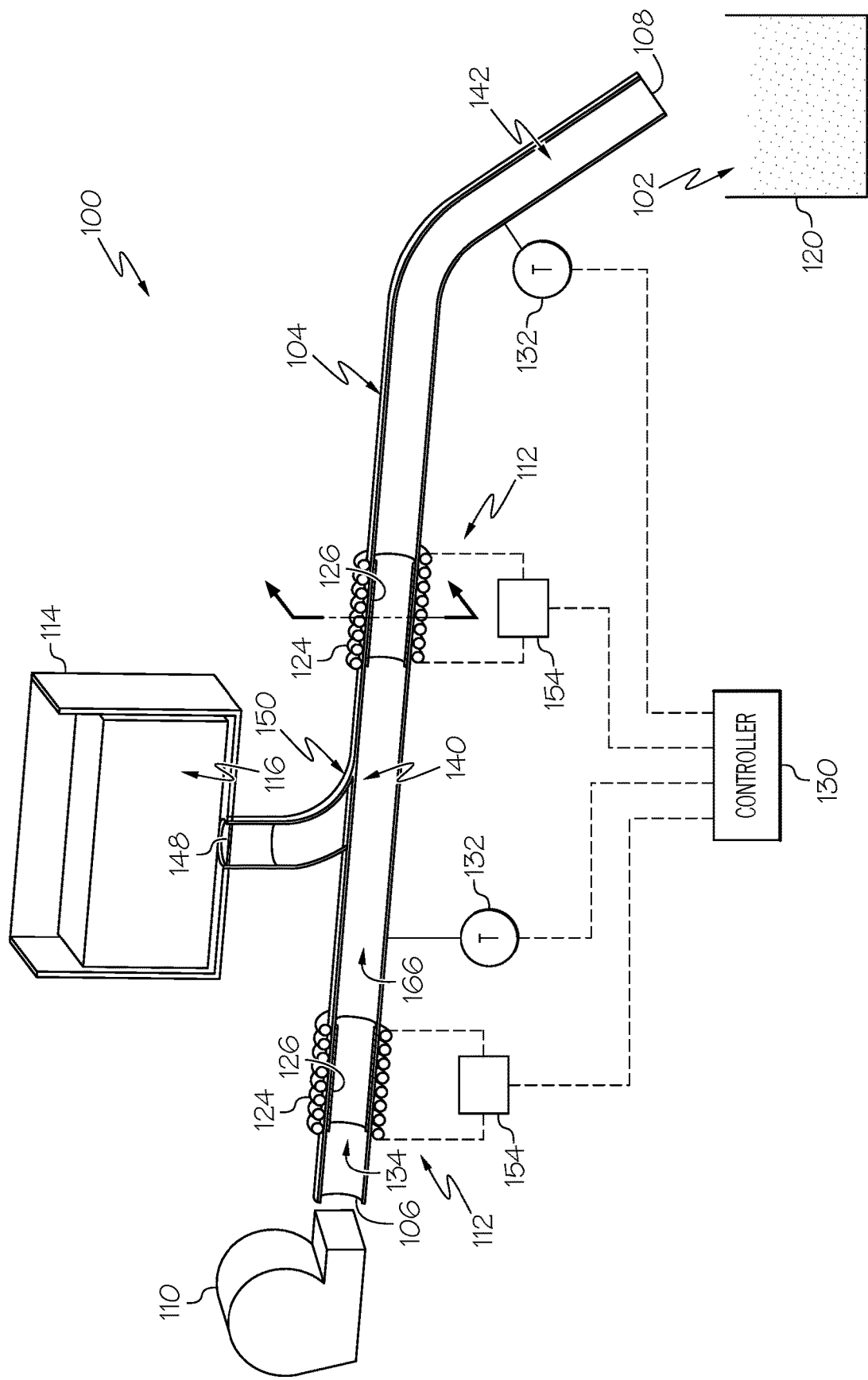
FIG. 2 is a schematic, perspective, sectional view of an example of the system for of FIG. 1.

FIGS. 1 and 2 schematically illustrate examples of a disclosed system 100 for preheating a thermoplastic charge 102. The system 100 includes a conduit 104. The conduit 104 has an inlet 106 and an outlet 108. The system 100 also includes a gas moving unit 110. The gas moving unit 110 is configured to move a gas 134 through the conduit 104 from the inlet 106 to the outlet 108. The system 100 further includes a heating assembly 112. The heating assembly 112 is positioned between the inlet 106 and the outlet 108 to heat the gas 134 moving through the conduit 104. The system 100 also includes a holding vessel 114. The holding vessel 114 is in fluid communication with the conduit 104. The holding vessel 114 houses a thermoplastic particulate material 116. The thermoplastic particulate material 116 includes a thermoplastic matrix material 118. The gas 134, moving through the conduit 104, transports the thermoplastic particulate material 116 to the outlet of the conduit 104. Accordingly, a gas-particulate mixture 140 moves through the conduit 104 to the outlet 108 of the conduit 104.

The disclosed system 100 enables the thermoplastic particulate material 116 to be pre-heated to a temperature below its melting temperature and to be introduced to a compression molding tool in its pre-heated state. The present disclosure recognizes that in conventional compression molding techniques the molding tool is heated, which in turn heats the thermoplastic material within the molding tool to a molding temperature. However, due to the relatively low thermal conductivity of the thermoplastic material, it can take significantly longer for the thermoplastic material to reach the molding temperature than it takes for the molding tool to reach that temperature. Pre-heating the thermoplastic particulate material 116 advantageously reduces the thermal cycle time needed to bring the thermoplastic particulate material 116 to the molding temperature.

In an example, the conduit 104 includes, or takes the form of, a channel having a closed cross-section that is configured to convey the gas 134 and the thermoplastic particulate material 116. For example, the conduit 104 is a tubular member. The conduit 104 conveys the gas 134 from the inlet 106 to the outlet 108. After introduction of the thermoplastic particulate material 116 into the conduit 104 for mixture with the gas 134, the conduit 104 conveys the gas-particulate mixture 140 to the outlet 108. As used herein, the term "gas-particulate mixture" refers to a mixture of the gas 134 and the thermoplastic particulate material 116.

In an example, the gas moving unit 110 includes, or takes the form of, any one of various suitable machines configured to provide sufficient force to move the gas 134 and the gas-particulate mixture 140 through the conduit 104, such as a fan, a blower, and the like. The gas moving unit 110 is in fluid communication with the inlet 106 of the conduit 104 to establish a flow of the gas 134 through the conduit 104. In an example, the gas moving unit 110 is coupled to the inlet 106 of the conduit 104.

In an example, the heating assembly 112 includes, or takes the form of, any one of various suitable heaters configured to sufficiently heat at least a portion of the conduit 104 and/or at least a portion of an interior volume of the conduit 104 in order to heat at least one of the gas 134 and the gas-particulate mixture 140 moving through the conduit 104 to yield a heated gas-particulate mixture 142. The heated gas-particulate mixture 142 moves through the conduit 104 to the outlet 108. In an example, the heating assembly 112 includes a resistive heater that is in thermal communication with at least one of the conduit 104 and/or the interior volume of the conduit 104. In another example, as will be described in greater detail herein below, the heating assembly 112 includes an induction heater in thermal communication with at least one of the conduit 104 and/or the interior volume of the conduit 104.

In an example, the holding vessel 114 includes, or takes the form of, any one of various types of hollow containers configured hold an amount of the thermoplastic particulate material 116 and introduce the thermoplastic particulate material 116 to the flow of the gas 134 moving through the conduit 104. In an example, the holding vessel 114 includes a hopper. The holding vessel 114 is coupled to the conduit 104 and is in fluidic or volumetric communication with the interior volume of the conduit 104 for introduction of the thermoplastic particulate material 116 into the conduit 104 and to the flow of the gas 134. An introduction location 150 (FIG. 2) of the thermoplastic particulate material 116 into the conduit 104 (e.g., where the holding vessel 114 is coupled to the conduit 104) is between the inlet 106 and the outlet 108. In an example, the holding vessel 114 has an operable opening 148 (FIG. 2) that is selectively opened and closed to discharge or deposit the thermoplastic particulate material 116 into the conduit 104.

In an example, the system 100 includes a mold 120. The mold 120 is configured for compression molding the thermoplastic particulate material 116 that is received from the outlet 108 of the conduit 104. In an example, the mold 120 forms at least a portion of a compression molding machine used for compression molding the thermoplastic charge 102 into one or more thermoplastic composite parts. In other words, a thermoplastic composite part 152 (FIG. 1) is compression molded in the compression molding machine. The mold 120 includes at least one mold cavity, or material reservoir, that has a geometry defining the thermoplastic composite part 152 being made. In various examples, any suitable molding equipment and technique may be used.

As used herein, the term "thermoplastic charge" refers to an amount of the thermoplastic particulate material 116 that is loaded, or otherwise deposited, into the mold cavity of the mold 120. According to the examples of the system 100 and method 1000 disclosed herein, the thermoplastic charge 102 is pre-heated by pre-heating the thermoplastic particulate material 116 moving through the conduit 104. In an example, the size or volume of the thermoplastic charge 102 is preselected and is controlled by managing the amount of the thermoplastic particulate material 116 that is loaded into the mold 120.

In an example implementation using the disclosed system 100 to pre-heat the thermoplastic particulate material 116, which includes the thermoplastic matrix material 118, and to make the thermoplastic composite part 152, the pre-heated thermoplastic charge 102 (e.g., an amount of pre-heated thermoplastic particulate material 116) is loaded into the mold 120 from the outlet 108 of the conduit 104. The thermoplastic charge 102 of (e.g., randomly oriented) thermoplastic particulate material 116 is further heated within the mold 120 until the thermoplastic matrix material 118 of the thermoplastic particulate material 116 melts and becomes moldable. The molded thermoplastic charge 102 is then allowed to cool and solidify to form the thermoplastic composite part 152.

In an example, the thermoplastic matrix material 118 includes a relatively high viscosity thermoplastic resin. As examples, the thermoplastic matrix material 118 of the thermoplastic particulate material 116 includes at least one of polyetherimide (PEI), polyphenylene sulphide (PPS), polyethersulfone (PES), polyetheretherketone (PEEK), polyetherketoneketone (PEKK), and polyetherketoneketone-fc grade (PEKK-FC). Other examples of the thermoplastic matrix material 118 of the thermoplastic particulate material 116 are also contemplated.

Referring generally to FIG. 1, in an example, the thermoplastic particulate material 116 includes reinforcing fibers 122. In an example, the reinforcing fibers 122 include any one or more of various high strength fibers. As examples, the reinforcing fibers 122 of the thermoplastic particulate material 116 includes at least one of carbon fibers, metal fibers, ceramic fibers, and glass fibers. Other examples of the reinforcing fibers 122 of the thermoplastic particulate material 116 are also contemplated. In another example, the thermoplastic particulate material 116 other types of reinforcing materials, such as metallic particles, ceramic particles, or whiskers.

In an example implementation using the disclosed system 100 to pre-heat the thermoplastic particulate material 116, which includes the thermoplastic matrix material 118 and the reinforcing fibers 122) and to make the thermoplastic composite part 152, the pre-heated thermoplastic charge 102 (e.g., an amount of pre-heated thermoplastic particulate material 116) is loaded into the mold 120 from the outlet 108 of the conduit 104. The thermoplastic charge 102 of (e.g., randomly oriented) thermoplastic particulate material 116 is further heated within the mold 120 until the thermoplastic matrix material 118 of the thermoplastic particulate material 116 melts and becomes moldable, resulting in a moldable mixture of melted thermoplastic particulate material 116 and reinforcing fibers 122. The molded thermoplastic charge 102 is then allowed to cool and solidify to form the thermoplastic composite part 152.

In an example, the thermoplastic particulate material 116 is in the form of a plurality of flakes 144 of the thermoplastic particulate material 116. The flakes 144 provide a beneficial geometry for efficient heat transfer from the gas 134 to the thermoplastic particulate material 116.

In an example, the plurality of flakes 144 is formed from unidirectional fibers (e.g., reinforcing fibers 122) pre-impregnated with a thermoplastic resin (e.g., thermoplastic matrix material 118). In this example, the thermoplastic charge 102 may take the form of randomly oriented, thermoplastic infused fiber flakes. In this example, the source of the thermoplastic material that forms the thermoplastic composite part 152 is derived from the thermoplastic matrix material 118 contained in the plurality of flakes 144 (e.g., resin infused fiber flakes). However, in an alternative example, the plurality of flakes 144 of the thermoplastic particulate material 116 includes dry fiber flakes (e.g., reinforcing fibers 122 that are not pre-impregnate with resin) and thermoplastic resin flakes (e.g., thermoplastic matrix material 118). In this example, the fiber content of the thermoplastic charge 102 may be better controlled.

In an example, the plurality of flakes 144 may be formed, for example and without limitation, using a rotary chopper to chop fiber pre-preg tape, or by die cutting individual shapes from a roll or strip of pre-preg tape having a high fiber content or from a sheet of pre-preg having a high fiber content. Other productions processes to form the plurality of flakes 144 are also contemplated.

The plurality of flakes 144 may have any one or more of various shapes, which may, for example, aid in distribution and random orientation of the reinforcing fibers 122 within the melted mixture of the thermoplastic matrix material 118 and the reinforcing fibers 122 in the mold cavity of the mold 120. The specific shapes of the plurality of flakes 144 may also assist in imparting quasi-isotropic mechanical properties to the thermoplastic composite part 152 by incorporating various lengths of fiber reinforcement within the mixture.

In other examples, the thermoplastic particulate material 116 has any one of various other shapes, such as a plurality of spheres of the thermoplastic particulate material 116, a plurality of ellipsoids of the thermoplastic particulate material 116, and the like.

Referring to FIGS. 1 and 2, in an example, the heating assembly 112 takes the form of an induction heater (e.g., is an induction heating assembly). The heating assembly 112 includes an induction coil 124. The induction coil 124 surrounds the conduit 104. The heating assembly 112 also includes a susceptor 126. The susceptor 126 is positioned between the induction coil 124 and the gas 134 and/or the gas-particulate mixture 140 moving through the conduit 104. The induction coil 124 generates eddy current heating in the susceptor 126.

Referring to FIG. 2, in an example, induction coil 124 is wrapped around at least a portion of an exterior (e.g., an outside) of the conduit 104. A power source 154 is connected to opposing ends of the induction coil 124. The power source 154 is able to pass an alternating current (AC) through the induction coil 124. As the current passes through the windings of the induction coil 124, a magnetic field is generated. The susceptor 126 is located within the magnetic field of the induction coil 124 and eddy currents are induced in the susceptor 126. The eddy currents flow against the electrical resistivity of the material used to form the susceptor 126, which generates localized heat within the susceptor 126. This is referred to as induction heating, where the induction coil 124 is able to induce heat into the susceptor 126 without direct contact.

Referring to FIG. 1, in an example, the susceptor 126 includes a ferromagnetic material 146. For example, the susceptor 126 is formed of the ferromagnetic material 146. In an example, the susceptor 126 includes, or is formed of, at least one of a cobalt alloy, an iron alloy, a nickel and iron alloy, an iron and silicon alloy, an amorphous magnetic alloy, a crystalline magnetic alloy, or some other suitable material.

The susceptor 126 may have any one of various forms or shapes, such as a wire, a strip, a plate, a ring, a sheet, a woven fabric of wires, or some other suitable shape. The particular shape selected may vary depending on the particular implementation of the heating assembly 112.

In an example, the thermoplastic matrix material 118 has a melting temperature 136. The susceptor 126 has a Curie temperature 138. The Curie temperature 138 of the susceptor 126 is less than the melting temperature 136 of the thermoplastic matrix material 118. In an example, the susceptor 126 (e.g., the ferromagnetic material 146 of the susceptor 126) is selected based on its Curie temperature 138 to be less than the melting temperature 136 of the thermoplastic matrix material 118.

The susceptor 126 may be referred to as a "smart susceptor." A smart susceptor is a select type of susceptor that is constructed of a magnetic or magnetically permeable material that generates heat efficiently until reaching a threshold temperature, referred to as a Curie temperature or Curie point. The Curie temperature, or Curie point, is the temperature at which certain magnetic materials undergo a sharp change in their magnetic properties. In an example, as portions of the smart susceptor reach the Curie temperature, the magnetic permeability of those portions drops precipitously. The drop in magnetic permeability has two effects: (1) it limits the generation of heat by those portions at the Curie temperature; and (2) it shifts the magnetic flux to the lower temperature portions causing those portions below the Curie temperature to more quickly heat up to the Curie temperature.

Accordingly, the susceptor 126 is inductively heated via the induction coil 124 to heat the thermoplastic particulate material 116 to a preselected heating temperature that is kept below the melting temperature 136 (or melting point) of the thermoplastic particulate material 116. The susceptor 126 enables relatively precise control of the temperature used to heat the thermoplastic particulate material 116.

In an example, the Curie temperature 138 of the susceptor 126 is between about fifty percent and about ninety-nine percent of the melting temperature 136 of the thermoplastic matrix material 118. In another example, the Curie temperature 138 of the susceptor 126 is between about eighty percent and about ninety-five percent of the melting temperature 136 of the thermoplastic matrix material 118. On other examples, other ranges of the Curie temperature 138 of the susceptor 126 relative to the melting temperature 136 of the thermoplastic matrix material 118 are also contemplated.

Figure 3:
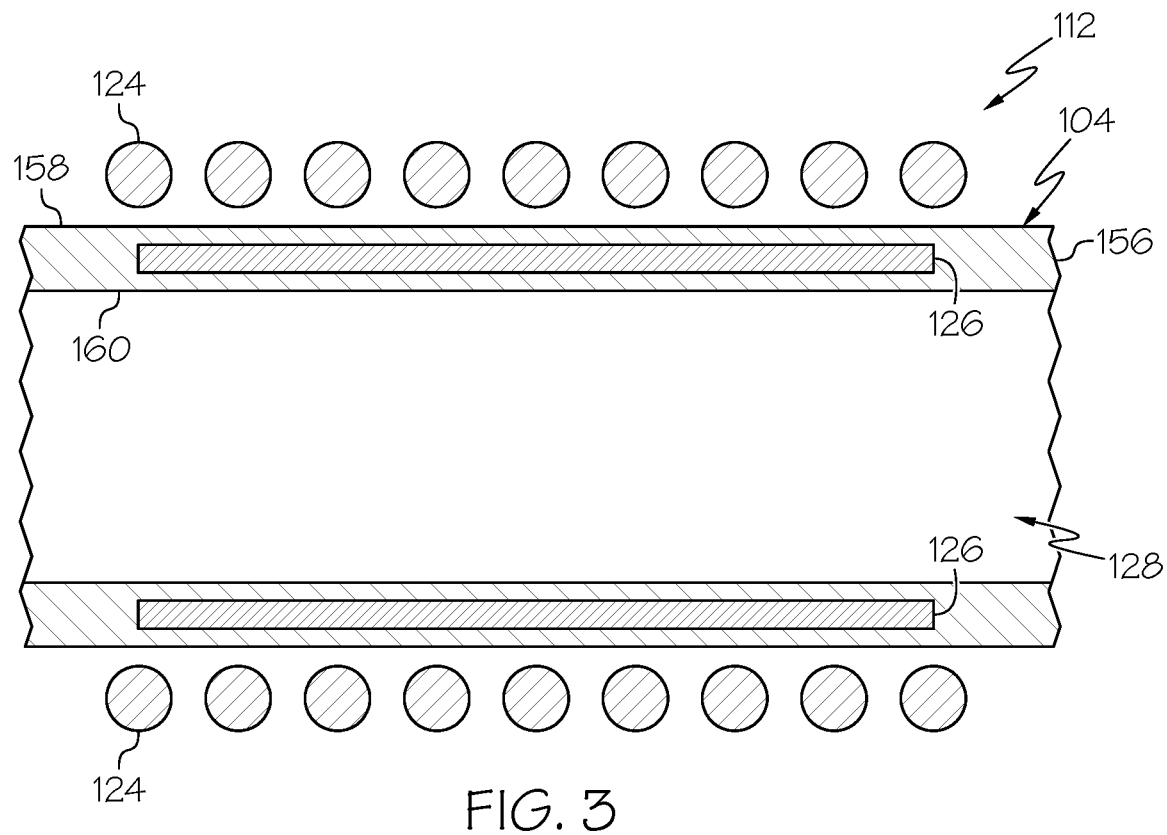
FIG. 3 is a schematic, side elevation, sectional view of an example of an heating assembly of the system of FIG. 1.

FIG. 3 schematically illustrates an example arrangement of the induction coil 124, the susceptor 126, and the conduit 104. In this example, the susceptor 126 is incorporated into the conduit 104. In an example, the conduit 104 includes, or is formed by, a tubular wall 156. The induction coil 124 is located on an outside of the tubular wall 156 and surrounds at least a portion of the conduit 104. The susceptor 126 is embedded within the tubular wall 156 that forms the conduit 104. For example, the susceptor 126 is located between an exterior surface 158 and an interior surface 160 of the tubular wall 156. An inside of the tubular wall 156 forms a flow channel 128 through which at least one of the gas 134 and the gas-particulate mixture 140 moves. In this example, heat is transferred from the susceptor 126, through a portion of thickness of the tubular wall 156, and to at least one of the gas 134 and the gas-particulate mixture 140 moving through the conduit 104.

Figure 4:
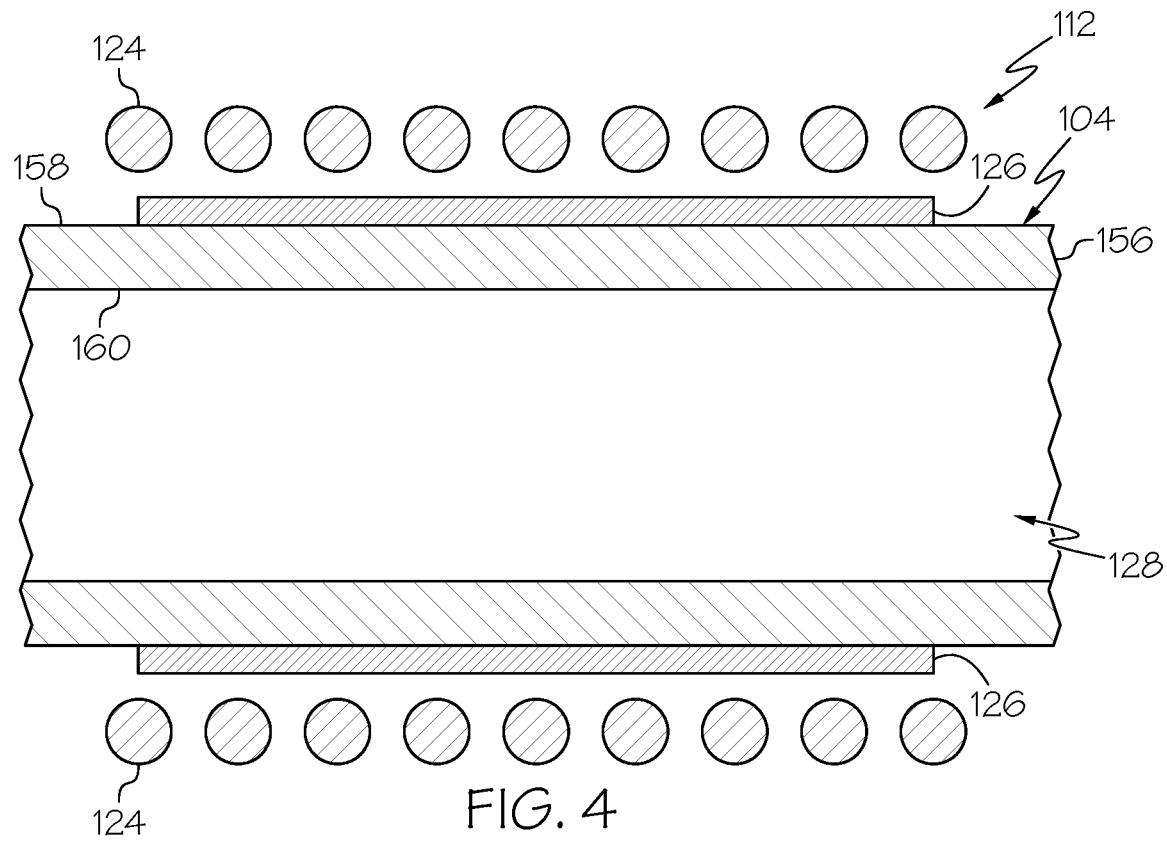
FIG. 4 is a schematic, side elevation, sectional view of an example of the heating assembly of the system of FIG. 1.

FIG. 4 schematically illustrates another example arrangement of the induction coil 124, the susceptor 126, and the conduit 104. In this example, the susceptor 126 is located external to the conduit 104. The induction coil 124 is located on the outside of the tubular wall 156 and surrounds at least a portion of the conduit 104. The susceptor 126 is located on the outside of the tubular wall 156 that forms the conduit 104. For example, the susceptor 126 is coupled to at least a portion of the exterior surface 158 of the tubular wall 156. The inside of the tubular wall 156 forms the flow channel 128 through which at least one of the gas 134 and the gas-particulate mixture 140 moves. In this example, heat is transferred from the susceptor 126, through the thickness of the tubular wall 156, and to at least one of the gas 134 and the gas-particulate mixture 140 moving through the conduit 104.

Figure 5:
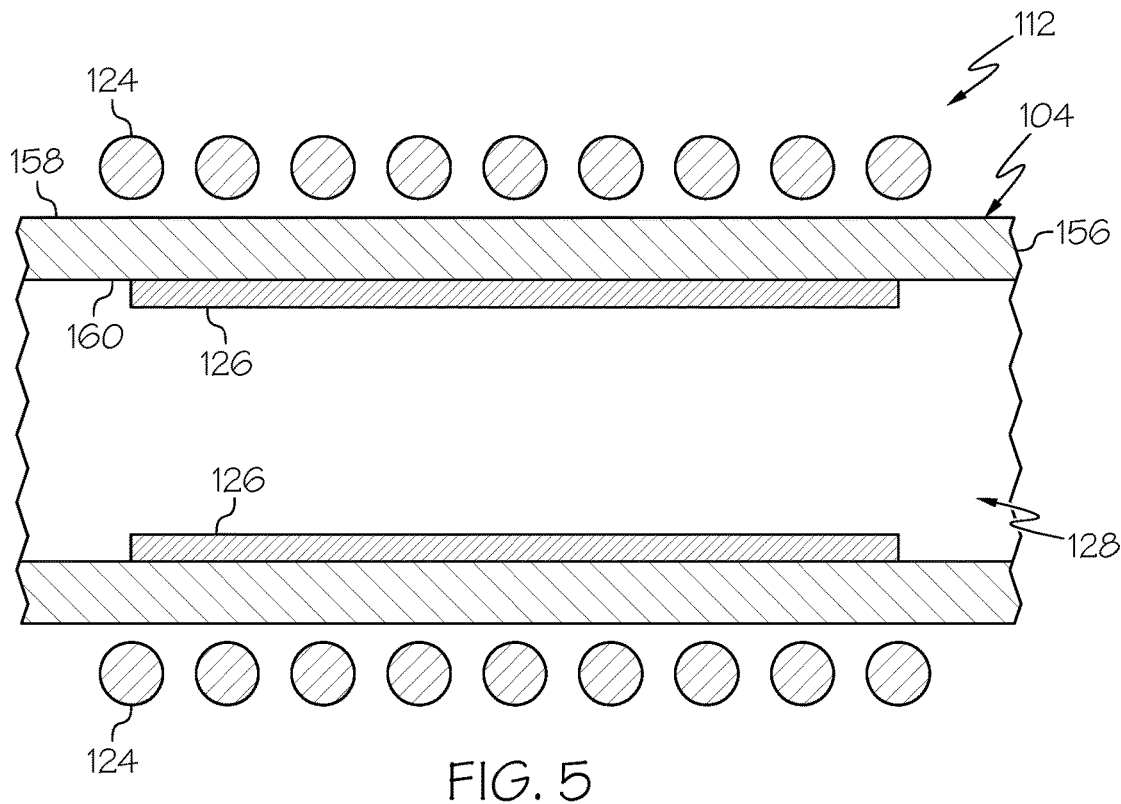
FIG. 5 is a schematic, side elevation, sectional view of an example of the heating assembly of the system of FIG. 1.

FIG. 5 schematically illustrates another example arrangement of the induction coil 124, the susceptor 126, and the conduit 104. In this example, the susceptor 126 is located internal to the conduit 104. The induction coil 124 is located on the outside of the tubular wall 156 and surrounds at least a portion of the conduit 104. The susceptor 126 is located on the inside of the tubular wall 156 that forms the conduit 104. For example, the susceptor 126 is coupled to at least a portion of the interior surface 160 of the tubular wall 156. The inside of the tubular wall 156 and the susceptor 126 form the flow channel 128 through which at least one of the gas 134 and the gas-particulate mixture 140 moves. In this example, heat is transferred from the susceptor 126 to at least one of the gas 134 and the gas-particulate mixture 140 moving through the conduit 104 as the gas 134.

Figure 6:
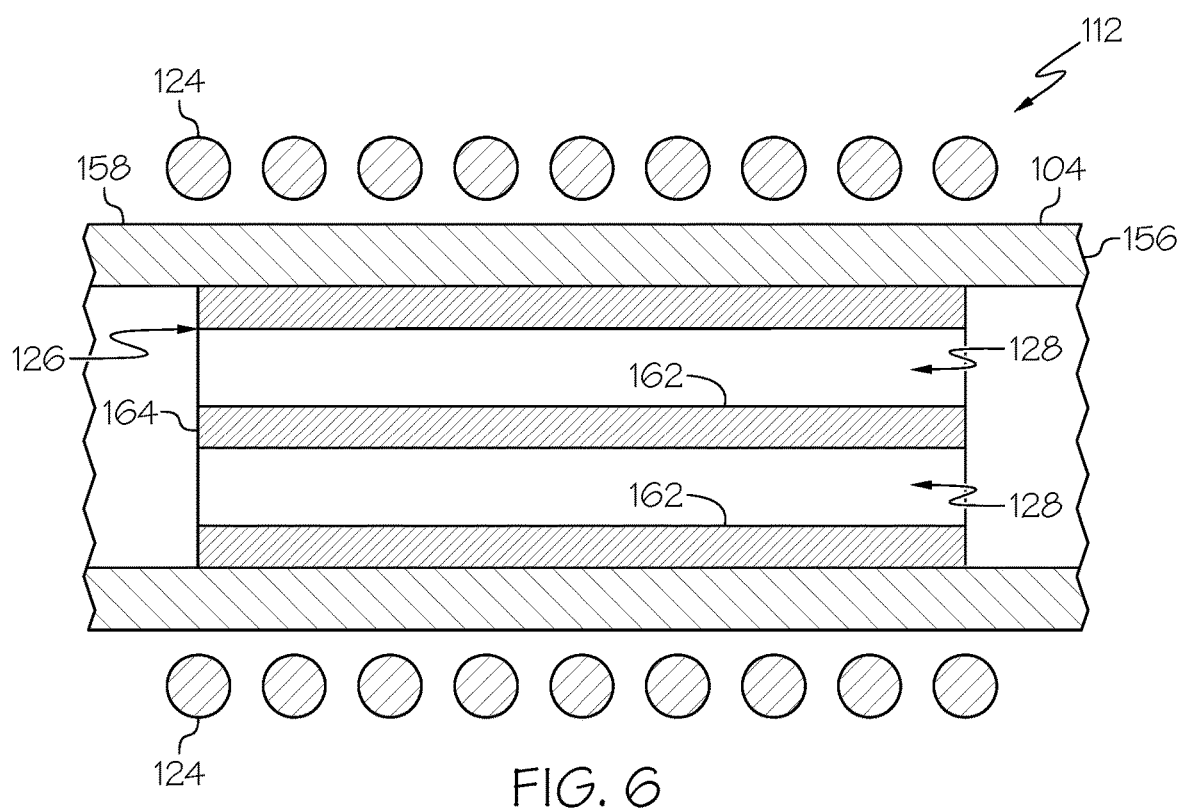
FIG. 6 is a schematic, side elevation, sectional view of an example of the heating assembly of the system of FIG. 1.
Figure 7:
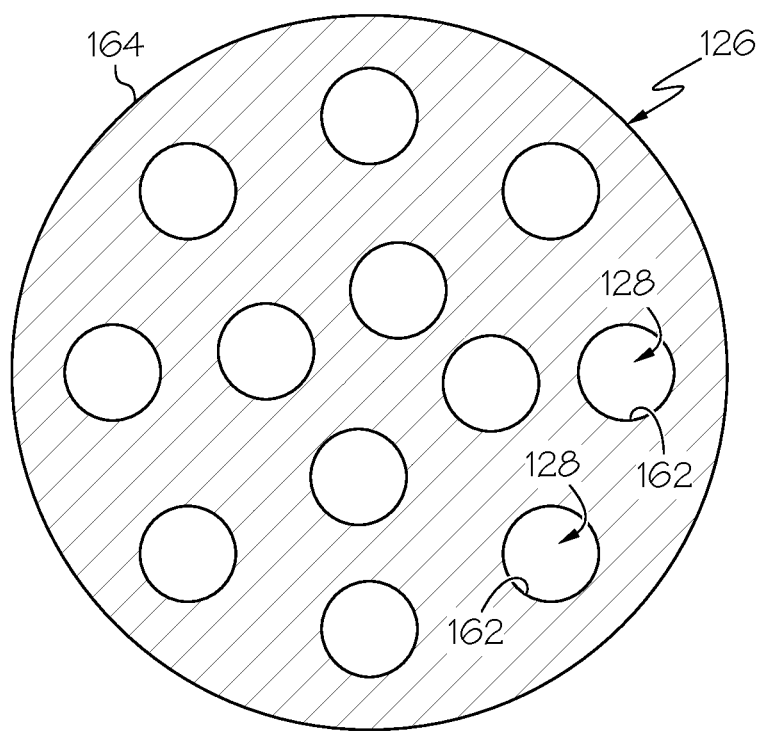
FIG. 7 is a schematic, front elevation, sectional view of an example of a susceptor shown in FIG. 6.

FIG. 6 schematically illustrates another example arrangement of the induction coil 124, the susceptor 126, and the conduit 104. FIG. 7 schematically illustrates an example of the susceptor 126 shown in FIG. 6. In this example, the susceptor 126 forms at least one flow channel 128 through which at least one of the gas 134 and the gas-particulate mixture 140 moves. The induction coil 124 is located on the outside of the tubular wall 156 and surrounds at least a portion of the conduit 104. The susceptor 126 is located on the inside of the tubular wall 156 that forms the conduit 104. For example, the susceptor 126 includes a body 164 (e.g., a block or other mass) of material (e.g., ferromagnetic material 146) having a cross-sectional shape that is complementary to the cross-sectional shape of the tubular wall 156 and filling at least a portion of the internal volume of the conduit 104 formed by the tubular wall 156. The susceptor 126 includes at least one channel 162 extending through the body 164. The channel 162 forms, or defines, the flow channel 128 through which at least one of the gas 134 and the gas-particulate mixture 140 moves. In this example, heat is transferred from the susceptor 126 to the gas 134 and/or the gas-particulate mixture 140 moving through the susceptor 126.

The susceptor 126 may have any number of channels 162 forming the flow channels 128 for at least one of the gas 134 and the gas-particulate mixture 140. Each channel 162 may have any inside dimension (e.g., diameter) and cross-sectional shape. The number, size, and/or shape of the channels 162 may be selected based on the heating characteristics needed to sufficiently heat the thermoplastic particulate material 116 before exiting the outlet 108 (FIG. 2) of the conduit 104. For example, a greater number of smaller channels 162 may provide more efficient heating than a lesser number of larger channels 162.

Referring to FIG. 2, in an example, the system 100 includes a plurality of heating assemblies 112. A first one of the heating assemblies 112 is located upstream from introduction of the thermoplastic particulate material 116 to the gas 134. The first one of the heating assemblies 112 heats the gas 134. A second one of the heating assemblies 112 is located downstream from the introduction of the thermoplastic particulate material 116 to the gas 134. The second one of the heating assemblies 112 heats the gas-particulate mixture 140.

As illustrated in FIG. 2, the gas moving unit 110 establishes the flow of the gas 134. The gas 134 enters the conduit 104 through the inlet 106. The first one of the heating assemblies 112 heats the gas 134 as it moves through the conduit 104 to yield a heated gas 166. The thermoplastic particulate material 116 is discharged from the holding vessel 114 into the conduit 104 at the introduction location 150 and is introduced to the heated gas 166 to yield the gas-particulate mixture 140. In this example, when the thermoplastic particulate material 116 is introduced to the heated gas 166, the heated gas 166 begins to heat the thermoplastic particulate material 116. The second one of the heating assemblies 112 heats the gas-particulate mixture 140 as it moves through the conduit 104 to yield the heated gas-particulate mixture 142. The heated gas-particulate mixture 142 then exits the conduit 104 through the outlet 108 where it is deposited into the mold 120 to form the preheated thermoplastic charge 102.

While not explicitly illustrated, in other examples, the system 100 may include any number of additional heating assemblies 112 located along the conduit 104. The additional heating assemblies 112 may be located upstream of the introduction location 150 of the thermoplastic particulate material 116 to further heat the gas 134 and/or located downstream from the introduction location 150 of the thermoplastic particulate material 116 to further heat the gas-particulate mixture 140. In another example, the system 100 may include one or more heating assemblies 112 located only upstream of the introduction location 150 of the thermoplastic particulate material 116 to heat only the gas 134. In another example, the system 100 may include one or more heating assemblies 112 located only downstream from the introduction location 150 of the thermoplastic particulate material 116 to heat only the gas-particulate mixture 140.

Referring still to FIG. 2, in an example, the system 100 includes a controller 130. The controller 130 is configured to control the heating assembly 112. For example, the controller 130 is coupled to the power source 154 and operatively controls the current supplied to the induction coil 124. The controller 130 may instruct the power source 154 to apply a current to the induction coil 124 or to stop applying a current to the induction coil 124. The controller 130 may also instruct the power source 154 as to a magnitude of the current applied to the induction coil 124. Control of the current applied to the induction coil 124 controls generation of the magnetic field, which in turn controls heating of the susceptor 126. In this example, the controller 130 may manage and automate the heating operation of at least one of the gas 134 and the gas-particulate mixture 142.

The controller 130 may include hardware (e.g., processor and memory), software, or a combination of hardware and software. The controller 130 may also include a suitable interface for communicating with automated devices. The communication medium for the controller 130 to these devices may be a wired connection or a wireless connection.

In another example, the controller 130, or one or more additional controllers, is configured to manage and automate other operations of the system 100, such as control of the gas moving unit 110 and/or a discharge rate of the thermoplastic particulate material 116 from the holding vessel 114.

In an example, the system 100 includes a temperature sensor 132. The temperature sensor 132 is coupled to the controller 130 and is positioned to measure a temperature of at least one of the gas 134 and the gas-particulate mixture 140 moving through the conduit 104. The temperature of at least one of the gas 134 and the gas-particulate mixture 140 may be measured to determine when the gas 134 and/or the gas-particulate mixture 140 reaches the desired temperature sufficient to pre-heat the thermoplastic particulate material 116. In this example, the controller 130 and the temperature sensor 132 manage and automate the heating operation of at least one of the gas 134 and the gas-particulate mixture 142. For example, the controller 130 and the temperature sensor 132 may provide a feedback loop to determine and control the magnetic field generated by the induction coil 124 to adjust the heating temperature of the susceptor 126.

In the illustrative example, the system 100 includes a plurality of temperature sensors 132. A first one of the temperature sensors 132 is located between the first one of the heating assemblies 112 and the introduction location 150 of the thermoplastic particulate material 116 to the gas 134. The first one of the temperature sensors 132 determines the temperature of the heated gas 166. A second one of the temperature sensors 132 is located downstream from the second one of the heating assemblies 112. The second one of the temperature sensors 132 determines the temperature of the heated gas-particulate mixture 142.

Figure 8:
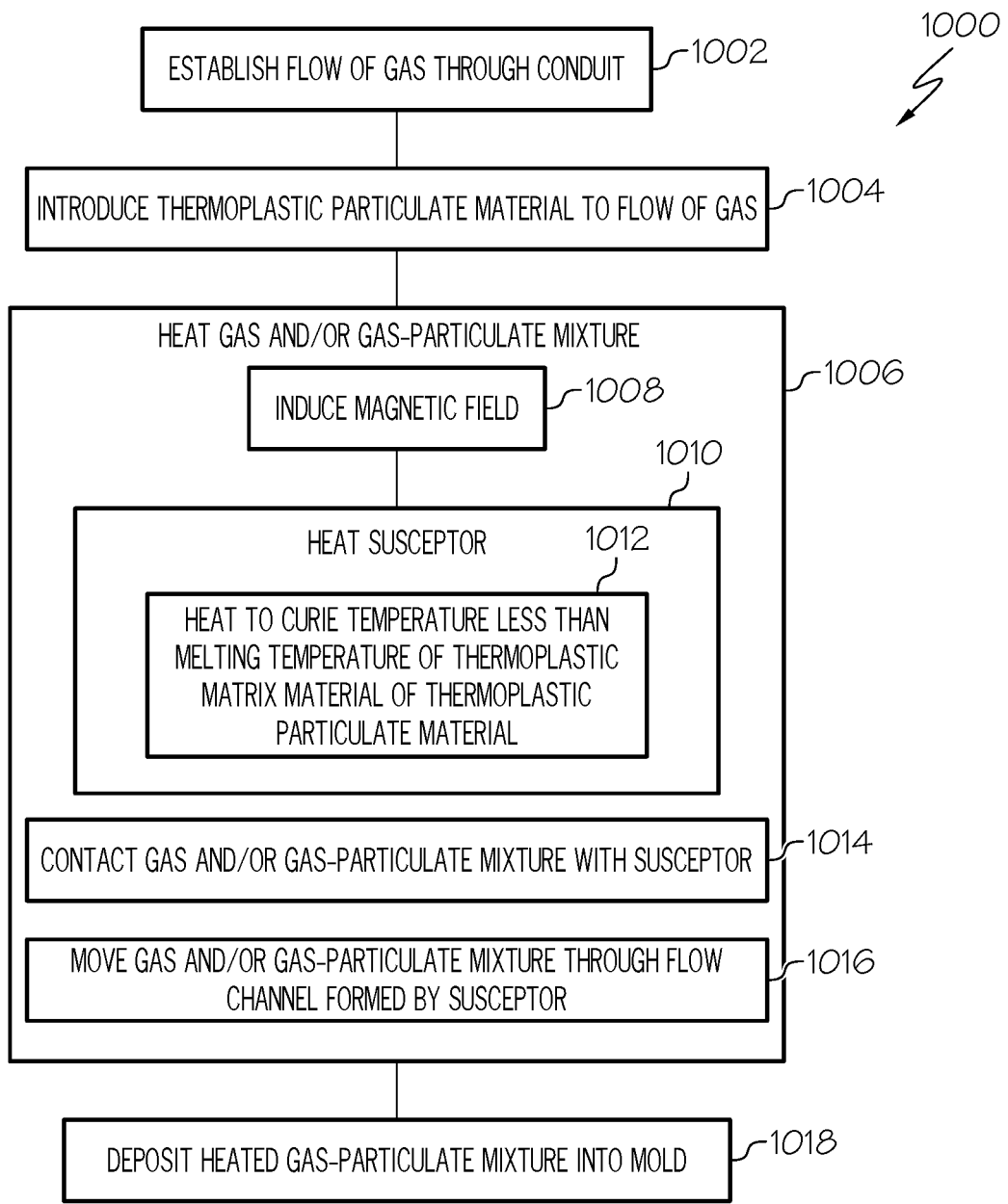
FIG. 8 is a flow diagram depicting an example of the disclosed method for preheating a thermoplastic charge.

FIG. 8 illustrates an example of the disclosed method 1000 for preheating the thermoplastic charge 102. The disclosed method 1000 enables the thermoplastic particulate material 116 to be pre-heated to a temperature below its melting temperature and to be introduced to the compression molding tool in its pre-heated state (e.g., as a pre-heated thermoplastic charge 102). Examples of the method 1000 use the system 100 described above and illustrated in FIGS. 1-7.

In an example, the method 1000 includes a step of (block 1002) establishing the flow of the gas 134 through the conduit 104. In an example, the flow of the gas 134 through the conduit 104 is established using the gas moving unit 110 (FIGS. 1 and 2). The method 1000 also includes a step of moving the gas 134 through the conduit 104.

In an example, the method 1000 includes a step of (block 1004) introducing the thermoplastic particulate material 116 to the flow of the gas 134 to yield the gas-particulate mixture 140. In an example, the thermoplastic particulate material 116 is introduced to the flow of the gas 134 at the introduction location 150 where the holding vessel 114 is coupled to the conduit 104. The method 1000 also includes a step of moving the gas-particulate mixture 140 through the conduit 104.

In an example, the method 1000 includes a step of (block 1006) heating at least one of the gas 134 and the gas-particulate mixture 140 using the heating assembly 112 to yield the heated gas-particulate mixture 142. In an example, the method 1000 includes a step of locating the heating assembly 112 upstream from introduction of the thermoplastic particulate material 116 to the gas 134 and heating the gas 134 to yield the heated gas 166. In another example, the method 1000 includes a step of locating the heating assembly 112 downstream from the introduction of the thermoplastic particulate material 116 to the gas 134 to heat the gas-particulate mixture 140 to yield the heated gas-particulate mixture 142. In another example, the method 1000 includes a step of locating a first heating assembly 112 upstream from introduction of the thermoplastic particulate material 116 to the gas 134 to heat the gas 134 to yield the heated gas 166 and a step of locating a second heating assembly 112 downstream from the introduction of the thermoplastic particulate material 116 to the gas 134 to heat the gas-particulate mixture 140 to yield the heated gas-particulate mixture 142.

In an example, according to the method 1000, the step of (block 1006) heating at least one of the gas 134 and the gas-particulate mixture 140 using the heating assembly 112 to yield the heated gas-particulate mixture 142 includes a step of (block 1008) inducing a magnetic field using the induction coil 124 surrounding the conduit 104 and a step of (block 1010) heating the susceptor 126, positioned in the magnetic field between the induction coil 124 and the at least one of the gas 134 and the gas-particulate mixture 140 moving through the conduit 104.

In an example, according to the method 1000, the step of (block 1010) heating the susceptor 126, positioned in the magnetic field between the induction coil 124 and the at least one of the gas 134 and the gas-particulate mixture 140 moving through the conduit 104, includes a step of (block 1012) heating the susceptor 126 to the Curie temperature 138 of the susceptor 126. In an example, the Curie temperature 138 of the susceptor 126 is less than the melting temperature 136 of the thermoplastic matrix material 118 of the thermoplastic particulate material 116.

In an example, the method 1000 includes a step of selecting a material (e.g., the ferromagnetic material 146) for the susceptor 126 that has a Curie temperature 138 that is less than the melting temperature 136 of the thermoplastic matrix material 118 of the thermoplastic particulate material 116. In an example, the step of selecting the material for the susceptor 126 includes a step of selecting the material for the susceptor 126 that has a Curie temperature 138 between about fifty percent and ninety-nine percent of the melting temperature 136 of the thermoplastic matrix material 118. In another example, the step of selecting the material for the susceptor 126 includes a step of selecting the material for the susceptor 126 that has a Curie temperature 138 between about eighty percent and ninety-five percent of the melting temperature 136 of the thermoplastic matrix material 118.

In an example, the method 1000 includes a step of measuring a temperature of the gas 134 moving through the conduit 104. In an example, the temperature of the gas 134 moving through the conduit 104 is measured using the temperature sensor 132. In an example, the method 1000 includes a step of locating the temperature sensor 132 downstream from the heating assembly 112 to measure the temperature of the heated gas 166. In another example, the method 1000 includes a step of locating the temperature sensor 132 downstream from the heating assembly 112 to measure the temperature of the heated gas-particulate mixture 142. In another example, the method includes a step of locating a first temperature sensor 132 downstream from the first heating assembly 112 to measure the temperature of the heated gas 166 and locating a second temperature sensor 132 downstream from the second heating assembly 112 to measure the temperature of the heated gas-particulate mixture 142.

In an example, the method 1000 includes a step of controlling the magnetic field generated by the induction coil 124 to control the heating temperature of the susceptor 126. In an example, control of the magnetic field is achieved by controlling a current applied to the induction coil 124 by the power source 154. The power source 154 is controlled using the controller 130. In an example, control of the magnetic field is based on the temperature measurements from the temperature sensor 132.

In an example, according to the method 1000, the step of (block 1006) heating the at least one of the gas 134 and the gas-particulate mixture 140 using the heating assembly 112 to yield the heated gas-particulate mixture 142 includes a step of (block 1014) contacting the at least one of the gas 134 and the gas-particulate mixture 140 with the susceptor 126. For example, the method 1000 includes a step of locating the susceptor 126 internal to the conduit 104 so that at least one of the gas 134 and the gas-particulate mixture 140 comes into contact with the susceptor 126 as it moves through the conduit 104.

In an example, according to the method 1000, the step of (block 1006) heating the at least one of the gas 134 and the gas-particulate mixture 140 using the heating assembly 112 to yield the heated gas-particulate mixture 142 includes a step of (block 1016) moving the at least one of the gas 134 and the gas-particulate mixture 140 through at least one flow channel 128 formed by the susceptor 126. For example, the method 1000 includes a step of locating the body 164 of the susceptor 126 internal to the conduit 104 so that at least one of the gas 134 and the gas-particulate mixture 140 comes into contact with the susceptor 126 as it moves through at least one channel 162 formed in the body 164.

In an example, the method 1000 includes a step of (block 1018) depositing the heated gas-particulate mixture 142 into the mold 120. For example, the method 1000 includes a step of depositing, or loading, an amount of the pre-heated thermoplastic particulate material 116 exiting the outlet 108 of the conduit into the mold 120 to form at least a portion of the pre-heated thermoplastic charge 102.

The overall steps of the method 1000 for pre-heating the thermoplastic particulate material 116, as described above and shown in FIG. 8, uses the system 100, as described above and shown in FIGS. 1-7. Following pre-heating of the thermoplastic particulate material 116, the mold 120 is filled with the pre-heated thermoplastic charge 102 of the pre-heated thermoplastic particulate material 116. The thermoplastic charge 102 may be premeasured to correspond to a volume, which, when melted, substantially matches the volume of the mold cavity of the mold 120. The thermoplastic matrix material 118 of the thermoplastic charge 102 is then heated to its melting temperature and is melted within the mold cavity. The molded thermoplastic composite part 152 is then allowed to cool and solidify, and the mold 120 is parted and the thermoplastic composite part 152 is removed from the mold cavity.

The disclosed system 100 and method 1000 provide for the production of various types of thermoplastic composite parts using compression molding. Thermoplastic composite parts made using the disclosed system 100 and/or according to the disclosed method 1000 have low weight, high stiffness and high strength, and offer greater corrosion resistance compared to metallic parts. Examples of the thermoplastic composite parts include, but are not limited to, thermoplastic composite fasteners, thermoplastic composite structural components, and the like. Thermoplastic composite parts made using the disclosed system 100 and/or according to the disclosed method 1000 may be produced having a variety of sizes, geometries, and features. The particular design that is selected for any particular thermoplastic composite part will depend on the application and specific performance requirements of the thermoplastic composite part.

Figure 9:
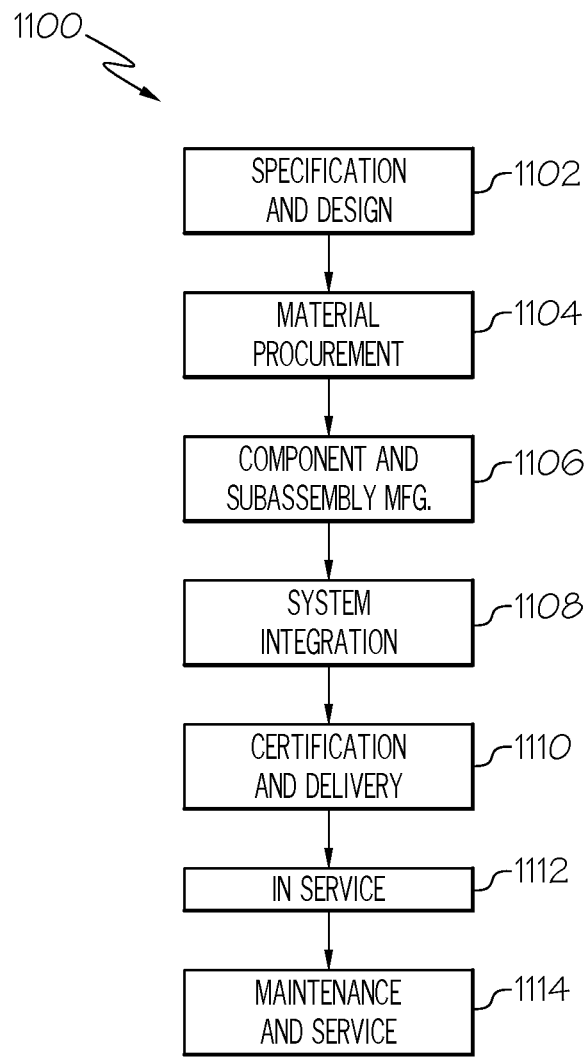
FIG. 9 is a flow diagram of an aircraft manufacturing and service methodology.
Figure 10:
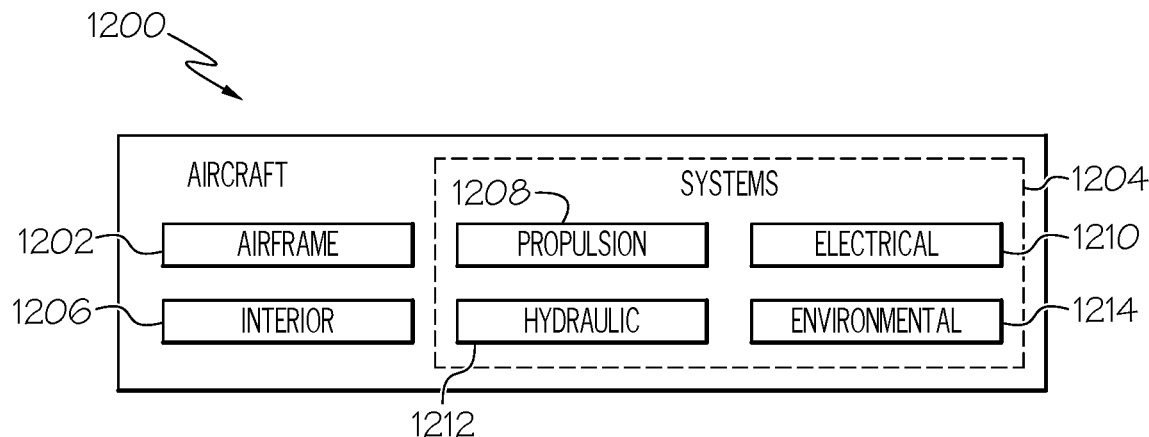
FIG. 10 is a block diagram of an aircraft.

Examples of the system 100 and the method 1000 disclosed herein may find use in a variety of potential applications, particularly in the transportation industry, including for example, aerospace applications. Referring now to FIGS. 9 and 10, examples of the system 100 and the method 1000 may be used in the context of an aircraft manufacturing and service method 1100, as shown in the flow diagram of FIG. 9 and the aircraft 1200, as shown in FIG. 10. Aircraft applications may include pre-heating a thermoplastic charge for a compression molding operation to make a thermoplastic composite part of the aircraft 1200 using the disclosed system 100 and/or according to the disclosed method 1000.

FIG. 10 is an illustrative example of the aircraft 1200. The aircraft 1200 includes an airframe 1202, a plurality of high-level systems 1204, and an interior 1206. Examples of the high-level systems 1204 include one or more of a propulsion system 1208, an electrical system 1210, a hydraulic system 1212, and an environmental system 1214. In other examples, the aircraft 1200 may include any number of other types of systems. The aircraft 1200 illustrated in FIG. 10 is an example of an aircraft having one or more thermoplastic composite parts made using the system 100 and/or according to the method 1000 disclosed herein.

As illustrated in FIG. 9, during pre-production, the method 1100 may include specification and design of aircraft 1200 (block 1102) and material procurement (block 1104). During production of the aircraft 1200, component and subassembly manufacturing (block 1106) and system integration (block 1108) of the aircraft 1200 may take place. Thereafter, the aircraft 1200 may go through certification and delivery (block 1110) to be placed in service (block 1112). Implementation of the disclosed method 1000 and/or use of the disclosed system 100 may form a portion of component and subassembly manufacturing (block 1106) and/or system integration (block 1108). Routine maintenance and service (block 1114) may include modification, reconfiguration, refurbishment, etc. of one or more systems of the aircraft 1200.

Each of the processes of the method 1100 illustrated in FIG. 9 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the system 100 and the method 1000 shown or described herein may be employed during any one or more of the stages of the manufacturing and service method 1100 shown in the flow diagram illustrated by FIG. 9. For example, thermoplastic composite parts, components, and structures of the aircraft 1200 made in accordance with the disclosed system 100 and method 1000 may correspond to component and subassembly manufacturing (block 1106) and may be prepared in a manner similar to components or subassemblies prepared while the aircraft 1200 is in service (block 1112). Also, one or more examples of the system 100 and the method 1000 described herein may be utilized during system integration (block 1108) and certification and delivery (block 1110). Similarly, one or more examples of the system 100 and the method 1000 described herein may be utilized, for example and without limitation, while the aircraft 1200 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to other vehicle structures (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the terms "about" and "approximately" refer to or represent a condition that is close to, but not exactly, the stated condition that still performs the desired function or achieves the desired result. As an example, the terms "about" and "approximately" refer to a condition that is within an acceptable predetermined tolerance or accuracy. For example, the terms "about" and "approximately" refer to a condition that is within 10% of the stated condition. However, the terms "about" and "approximately" do not exclude a condition that is exactly the stated condition.

In FIGS. 1 and 10, referred to above, the blocks may represent functional elements, features, or components thereof and lines connecting the various blocks do not necessarily imply any particular structure. Accordingly, modifications, additions and/or omissions may be made to the illustrated structure. Additionally, those skilled in the art will appreciate that not all elements described and illustrated in FIGS. 1-7, referred to above, need be included in every example and not all elements described herein are necessarily depicted in each illustrative example. Unless otherwise explicitly stated, the schematic illustrations of examples depicted in FIGS. 1-7 and 11, referred to above, are not meant to imply structural limitations with respect to the illustrative example. Rather, although one illustrative structure is indicated, it is to be understood that the structure may be modified when appropriate.

In FIGS. 8 and 9, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 8 and 9 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100 and the method 1000 have been shown and described, modifications may occur to those skilled in the art upon reading the specification. The present application includes such modifications and is limited only by the scope of the claims.

What is claimed is:

1. A system for preheating a thermoplastic charge, the system comprising:
   a conduit having an inlet and an outlet;
   a gas mover positioned to move a gas through the conduit from the inlet to the outlet;
   a holding vessel in fluid communication with the conduit, wherein:
      the holding vessel houses a thermoplastic particulate material, comprising a thermoplastic matrix material;
      the thermoplastic particulate material, from the holding vessel, is introduced to the gas to form a gas-particulate mixture; and
      the gas-particulate mixture moves through the conduit to the outlet of the conduit;
   a first heating assembly, located upstream from introduction of the thermoplastic particulate material to the gas, to heat the gas; and
   a second heating assembly, located downstream from the introduction of the thermoplastic particulate material to the gas, to heat the gas-particulate mixture.

2. The system of claim 1 further comprising a mold for compression molding the thermoplastic particulate material received from the outlet of the conduit.

3. The system of claim 1 wherein the thermoplastic particulate material further comprises reinforcing fibers.

4. The system of claim 1 wherein the thermoplastic particulate material is in a form of a plurality of flakes.

5. The system of claim 1 wherein the thermoplastic matrix material comprises a member selected from a group consisting of polyetherimide, polyphenylene sulphide, polyethersulfone, polyetheretherketone, polyetherketoneketone, and polyetherketoneketone-fc grade.

6. The system of claim 1 wherein at least one of the first heating assembly and the second heating assembly comprises:
   an induction coil surrounding the conduit; and
   a susceptor positioned between the induction coil and the gas,
   wherein the induction coil generates eddy current heating in the susceptor.

7. The system of claim 6 wherein:
   the thermoplastic matrix material has a melting temperature;
   the susceptor has a Curie temperature; and
   the Curie temperature of the susceptor is less than the melting temperature of the thermoplastic matrix material.

8. The system of claim 7 wherein the Curie temperature of the susceptor is between about fifty percent and ninety-nine percent of the melting temperature of the thermoplastic matrix material.

9. The system of claim 7 wherein the Curie temperature of the susceptor is between about eighty percent and ninety-five percent of the melting temperature of the thermoplastic matrix material.

10. The system of claim 7 wherein the susceptor comprises a ferromagnetic material.

11. The system of claim 7 wherein the susceptor is incorporated into the conduit.

12. The system of claim 7 wherein the susceptor is located external to the conduit.

13. The system of claim 7 wherein the susceptor is located internal to the conduit.

14. The system of claim 13 wherein the susceptor forms at least one flow channel through which at least one of the gas and the gas-particulate mixture moves.

15. The system of claim 1 further comprising a controller configured to control the first heating assembly and the second heating assembly.

16. The system of claim 15 further comprising a temperature sensor coupled to the controller and positioned to measure a temperature of the gas moving through the conduit.

17. A method for preheating a thermoplastic charge, the method comprising:
   establishing a flow of a gas through a conduit;
   heating the gas using a first heating assembly to yield a heated gas;
   introducing a thermoplastic particulate material to the flow of the heated gas to yield a gas-particulate mixture;
   heating the gas-particulate mixture using a second heating assembly to yield a heated gas-particulate mixture; and
   depositing the heated gas-particulate mixture into a mold.

18. The method of claim 17 wherein at least one of heating the gas and heating the gas-particulate mixture comprises:
   inducing a magnetic field using an induction coil surrounding the conduit; and
   heating a susceptor positioned in the magnetic field between the induction coil and at least one of the gas and the gas-particulate mixture moving through the conduit.

19. A method for preheating a thermoplastic charge, the method comprising:
   establishing a flow of a gas through a conduit;
   introducing flakes of thermoplastic particulate material to the flow of the gas to yield a gas-particulate mixture; and
   heating at least one of the gas and the gas-particulate mixture flowing through the conduit using a heating assembly to yield a heated gas-particulate mixture, wherein heating at least one of the gas and the gas-particulate mixture comprises:
   inducing a first magnetic field using a first induction coil surrounding the conduit upstream from introduction of the flakes of thermoplastic particulate material to the gas;
   heating a first susceptor positioned in the first magnetic field between the first induction coil and the gas moving through the conduit to heat the gas;
   inducing a second magnetic field using a second induction coil surrounding the conduit downstream from the introduction of the flakes of thermoplastic particulate material to the gas; and
   heating a second susceptor positioned in the second magnetic field between the second induction coil and the gas-particulate mixture moving through the conduit to heat the gas-particulate mixture.

20. The method of claim 19 wherein the heating the first susceptor comprises heating a susceptor having a Curie temperature less than a melting temperature of the thermoplastic matrix material.

* * * * *